United States Patent

Wang et al.

[11] Patent Number: 5,852,124
[45] Date of Patent: Dec. 22, 1998

[54] RUBBER-MODIFIED STYRENIC RESIN COMPOSITION

[75] Inventors: Ching-Liang Wang; Dong-Bi Shiueh, both of Tainan, Taiwan

[73] Assignee: Chi Mei Corporation, Tainan Hsien, Taiwan

[21] Appl. No.: 692,762

[22] Filed: Aug. 6, 1996

[51] Int. Cl.$^6$ .................................................. C08F 279/02
[52] U.S. Cl. ............................................ 525/316; 525/314
[58] Field of Search ..................................... 525/316, 314

[56] References Cited

U.S. PATENT DOCUMENTS 3,991,136  11/1976  Dalton et al. ............................ 525/261

*Primary Examiner*—Mark Warzel
*Attorney, Agent, or Firm*—Ladas & Parry

[57] ABSTRACT

A rubber-modified styrenic resin composition which has high falling impact strength, high gloss, high tensile strength and the product produced from which has little or no unpleasant odor is provided by controlling the residual styrenic monomers in the resin composition to a content of below 1500 ppm and the residual 4-vinyl cyclohexene to a content of below 150 ppm. The number average particle size of the butadienic rubber is 0.08 to 0.35 μm, the amount of butadienic rubber particles having a particle size of below 0.1 μm is 19.5 to 99%, the amount of the butadienic rubber particles having a particle size of between 0.1 to 0.25 μm is 0.5 to 60%, and the amount of the butadienic rubber particles having a particle size greater than 0.25 μm is 0.5 to 80%, based on the total number of the butadienic rubber particles.

5 Claims, No Drawings

RUBBER-MODIFIED STYRENIC RESIN COMPOSITION

BACKGROUND OF THE INVENTION

1. Field of the Invention

The present invention relates to a rubber-modified styrenic resin composition, more particularly to a styrenic resin composition which has excellent falling impact strength, high tensile strength, high gloss, and the product produced from which has scarcely any unpleasant odor.

2. Description of the Related Art

It is well known in the art that the rubber modified styrenic resin composition is an impact resistant resin composition produced by dispersing rubbery graft copolymers in a styrenic copolymer matrix. In practical application, a resin material used for office affair appliances, electronic appliances and some of the automobile parts should have both high impact strength and high gloss characteristics. A representative rubber modified styrenic resin composition which meets the above requirements is an ABS resin, which has been widely used for many years.

However, a rubber modified styrenic resin with higher impact strength generally has lower tensile strength and lower gloss. In contrast, a rubber modified styrenic resin with higher tensile strength and higher gloss usually has poor impact strength. This is because the impact strength, the tensile strength and the gloss of a resin are affected by the rubber content and the particle size of rubber in the resin. It is known that if the rubber content is higher or the particle size of the rubber is larger, the impact strength of the resin would be better. However, if the rubber content is lower or the particle size of the rubber is smaller, the tensile strength and the gloss of the resin would be higher.

During the processing, such as high temperature injection molding, blow molding or extrusion, of the conventional rubber modified styrenic resin, there usually generates unpleasant odor, which is thought to be originated from the addition of the mercaptan which acts as the molecular weight adjusting agent during the polymerization of the rubber modified styrenic resin. Since the mercaptans has a pungent, unpleasant odor and due to its low volatile property, the unpleasant odor can be easily retained in the resin. In order to overcome the above deficiencies, it has been suggested that generation of the unpleasant odor during the processing of the rubber modified styrenic resin may be eliminated by using high volatile tertiary butyl mercaptan as the molecular weight regulating agent which is removed by vacuum stripping. However, the improvement achieved thereby is not satisfactory. Obviously, the unpleasant odor generated during the production of rubber modified styrenic resin is not mainly due to the residue of the molecular weight regulating agent of the mercaptans.

In view of the above facts that it is difficult to obtain simultaneously the characteristics of high falling impact strength, high tensile strength, high gloss and low level of unpleasant odor of rubber modified styrenic resin, so a novel resin composition is therefore provided to attain the above characteristics.

SUMMARY OF THE INVENTION

The object of the present invention is to provide a rubber-modified styrenic resin composition which has high falling impact strength, high tensile strength, high gloss, and which has little or no unpleasant odor.

The present invention is characterized in that the rubber-modified styrenic resin composition comprises a matrix of styrenic-acrylic based copolymer formed from acrylonitrile monomers and/or methacrylate monomers, styrenic monomers and optionally, other copolymerizable monomers, and butadienic rubber particles dispersed in the matrix. The amount of the residual styrenic monomers in the resin composition is below 1500 ppm, while the amount of residual 4-vinylcyclohexene, which is one kind of butadiene dimer in the resin composition is below 150 ppm. The number average particle size of the butadienic rubber in the resin composition is between 0.08 to 0.35 $\mu$m. The number of the butadienic rubber particles having a particle size of below 0.1 $\mu$m is 19.5 to 99% based on the total number of the butadienic rubber particles. The number of the butadienic rubber particles having a particle size of between 0.1 to 0.25 $\mu$m is 0.5 to 60% based on the total number of the butadienic rubber particles. The number of the butadienic rubber particles having a particle size greater than 0.25 $\mu$m is 0.5 to 80% based on the total number of the butadienic rubber particles.

DETAILED DESCRIPTION OF THE PREFERRED EMBODIMENT

The matrix of the rubber modified styrenic resin composition is styrenic-acrylic based copolymer, which is prepared from 50 to 90 wt % of styrenic monomers, 10 to 50 wt % of acrylonitrile monomers and/or methacrylate monomers, and 0 to 40 wt % of other copolymerizable monomers. The weight average molecular weight of the styrenic-acrylic based copolymer is between 40,000 to 300,000, preferably between 60,000 to 250,000.

Examples of the styrenic monomers of the present invention are styrene, $\alpha$-methyl styrene, $\alpha$-chlorostyrene, p-tert-butyl styrene, p-methyl styrene, o-chlorostyrene, p-chlorostyrene, 2,5-dichlorostyrene, 3,4-dichlorostyrene, 2,4,6-tribromostyrene and 2,5-dibromostyrene. Styrene and $\alpha$-methyl styrene are preferred.

Examples of the acrylonitrile monomers of the present invention are acrylonitrile and methacrylonitrile. Acrylonitrile is preferred. Examples of the methacrylate monomers of the present invention are methyl methacrylate, ethyl methacrylate, propyl methacrylate, butyl methacrylate, benzyl methacrylate, hexyl methacrylate, cyclohexyl methacrylate, dodecyl methacrylate, 2-hydroxy ethyl methacrylate, glycidyl methacrylate, $\gamma$-methacryl oxypropyl trimethoxy silane and dimethylaminoethyl methacrylate. Methyl methacrylate is preferred.

The weight ratio of acrylonitrile monomers to methacrylate monomers is not particularly limited and is dependent on the physical properties desired. If the impact strength and the oil-resistance of the resin are of greater concern, the amount of acrylonitrile should be greater. If more attention is paid to the hardness and transparency of the resin, the amount of methacrylate monomers, particularly methyl methacrylate, should be greater.

Other copolymerizable monomers of the present invention may be acrylate monomers, acrylic acid monomer, methacrylic acid monomer, unsaturated dicarboxylic acid monomers, ethylene, propylene, pentene, 1-butene, 1-pentene, 4-methyl-1-pentene, vinyl chloride, vinylidene chloride, tetrafluoroethylene, chlorotrifluoroethylene, hexafluoropentene, propenyl amine, isobutenyl amine, vinyl acetate, ethyl vinyl ether and methyl vinyl ketone.

Suitable examples of the maleimide based monomer are maleimide, N-methyl maleimide, N-isopropyl maleimide, N-butyl maleimide, N-hexyl maleimide, N-octyl maleimide, N-dodecyl maleimide, N-cyclohexyl maleimide, N-phenyl maleimide, N-2,3-dimethyl phenyl maleimide, N-2,4-dimethyl phenyl maleimide, N-2,3-diethyl phenyl maleimide, N-2,4-diethyl phenyl maleimide, N-2,3-dibutyl phenyl maleimide, N-2,4-dibutyl phenyl maleimide, N-2,6-dimethyl phenyl maleimide, N-2,3-dichlorophenyl maleimide, N-2,4-dichlorophenyl maleimide, N-2,3-dibromophenyl maleimide and N-2,4-dibromophenyl maleimide. N-phenyl maleimide is preferred.

Examples of unsaturated dicarboxylic acid monomers or its ester are maleic anhydride, methenyl succinic anhydride, methyl maleic anhydride, pentacosanoic anhydride, dimethyl fumarate and esters derived therefrom.

Examples of acrylate monomers are methyl acrylate, ethyl acrylate, propyl acrylate and butyl acrylate. Butyl acrylate is preferred.

The butadienic rubber particles dispersed in the styrenic-acrylic based copolymer matrix are in the form of rubbery graft copolymers. The butadienic rubber is prepared from 100 to 50 wt % of 1,3-butadiene and 0 to 50 wt % of copolymerizable monomers. Examples of such butadienic rubber are polybutadiene, butadiene-styrenic copolymers, such as butadiene-styrene copolymer, butadiene-vinyl toluene copolymer, copolymers of butadiene and unsaturated cyanide, such as butadiene-acrylonitrile copolymer and butadiene-methacrylonitrile copolymer, butadiene-alkyl acrylate copolymers, such as butadiene-methyl acrylate copolymer, butadiene-ethyl acrylate copolymer and butadiene-butyl acrylate copolymer, butadiene-alkyl methacrylate copolymers, such as butadiene-methyl methacrylate copolymer, butadiene-ethyl methacrylate copolymer, and a terpolymer having a butadiene content of more than 50 wt %.

The butadienic rubber may be prepared by emulsion polymerization. A rubber latex having a number average particle size of 0.05 to 0.35 $\mu$m may be directly polymerized from monomers by an emulsion polymerization process. In an alternative, the monomers may be polymerized to form rubber latex having number average particle size of 0.05 to 0.20 $\mu$m firstly, which is then agglomerated to have a number average particle size of 0.22 to 0.35 $\mu$m by a freezing agglomerating method, a mechanical agglomerating method or an additive agglomerating method. The additives used in the additive agglomerating method are selected from acidic compounds, such as acetic anhydride, hydrochloric acid and diluted sulfuric acid, and inorganic salts, such as sodium chloride, potassium chloride, magnesium chloride, magnesium sulfate, and carboxyl group-containing polymeric agglomerating agents, such as methacrylic acid-butyl acrylate copolymer.

A rubber latex having a desired particle size distribution can be produced by modifying the amount and addition manner of the emulsifying agent, the reaction temperature, the reaction rate and the conversion of monomers during the preparation of the butadienic rubber latex. If the number average particle size of the rubber latex is more than 0.35 $\mu$m, an unpleasant odor of the rubber modified styrenic resin cannot be easily eliminated during resin preparation. However, from the view point of reducing the residual content of 4-vinyl cyclohexene, the butadienic rubber latex produced by agglomerating methods performs better in reducing residual 4-vinyl cyclohexene.

The butadiene and the copolymerizable monomers for preparing the butadienic rubber may be added at one time or continuously during polymerization. By the manner of continuous addition, the residual 4-vinyl cyclohexene can be effectively eliminated.

The rubbery polymer is partially cross-linked. The cross-linking agent is added in an amount of 0 to 2 wt % with respect to monomer during polymerization. Examples of suitable cross linking agents are divinyl benzene, diallyl maleate, diallyl fumarate, diallyl acetate and allyl acrylate. The gel content of the butadienic rubber latex is not particularly limited and is preferably in the range of 30 to 90%. The swelling index of the gel in benzene is preferably in the range of 2 to 60.

The rubbery graft copolymer is prepared by graft polymerization of 30 to 90 wt % of butadienic rubber and 70 to 10 wt % of a mixture of monomers. The mixture of monomers contains 50 to 90 wt % of styrenic monomer, 10 to 50 wt % of acrylonitrile monomer and/or methacrylate monomers, and 0 to 40 wt % of other copolymerizable monomers. The rubber graft copolymer is prepared by rubber graft polymerization from a mixture of monomers in the presence of a butadienic rubbery polymer so that a styrenic-acrylic based copolymer is chemically bonded to or grafted on the butadienic rubbery polymer. The degree of grafting is generally affected by several factors, such as the ratio of the monomer to the butadienic rubbery polymer, the polymerization conditions, the chemical properties of the butadienic rubbery polymer, the particle size, the addition rate of the monomers and the presence of a chain transfer agent. The polymerization may be emulsion polymerization, emulsion-bulk polymerization and emulsion-suspension polymerization. Emulsion polymerization is preferred.

The initiator added in the graft polymerization is generally in the range of 0.01 to 5.0 wt %, preferably in the range of 0.1 to 3.0 wt % based on the weight of the monomers. The molecular weight of the graft copolymer may be controlled by the polymerization temperature or by adding a small amount of a molecular weight regulating agent or by a combination of both. Examples of the molecular weight regulating agent (i.e., chain transfer agent) may be mercaptans, halogen compounds and terpenes and 2,4-diphenyl-4-methyl-1-pentene, for example, n-dodecyl mercaptan, tert-dodecyl mercaptan, carbon tetrabromide and terpinolene.

Generally, the monomers and initiators may be added at one time or may be added continuously or incrementally during the graft polymerization. The initiator may be any of the conventional initiators for use in an emulsion polymerization process, for example, a peroxide, an azo or a persulfate compound. Examples of oil-soluble peroxide initiators are di-tert-butylperoxide, benzoyl peroxide, lauroyl peroxide, oleyl peroxide, cumene hydroperoxide and tert-butyl hydroperoxide.

Graft polymerization of the butadienic rubber latex and the mixture of monomers is usually carried out at a temperature of 20° to 100° C. and a pressure of 0 to 100 P.S.I.G. under inert atmosphere with stirring. The polymerization time takes 2 to 10 hours, preferably 4 to 9 hours.

It has been found by the present inventors that the residual styrenic monomers and the residual 4-vinyl cyclohexene usually emitted from the rubber modified styrenic resin at a higher injection temperature and a higher injection rate. The emission of the residual styrenic monomers from the rubber modified styrenic resin would promote the emission of 4-vinyl cyclohexene, which is a synergistic effect of the diffusion of the unpleasant odor. This is thought to be the reason of the unpleasant odor generated during the injection molding or diffused by a molded product.

A good process for obtaining the resin composition of the present invention includes stripping the rubbery graft copolymer latex under vacuum at a suitable temperature, coagulating the rubbery graft copolymer latex with high temperature steam with or without vacuum. Washing the coagulated rubbery graft copolymer with high temperature water or drying the coagulated rubbery grafted copolymer under vacuum to a moisture content of below 3 wt %, preferably below 1 wt %. The rubbery graft copolymer thus obtained contains lower residual level of styrenic monomer and 4-vinyl cyclohexene. Another preferred manner does not include the treatment of vacuum drying. The coagulated rubbery graft copolymer is washed with water and dehydrated with a centrifugal dehydrator such that the moisture content is below 40 wt %. The partially dehydrated rubbery graft copolymer is further dehydrated with an extruder. Afterwards, the styrenic-acrylic based copolymer is melt blended with the partially dehydrated rubbery graft copolymer via the extruder. In order to get lower level of residual 4-vinyl cyclohexene, it is better for us to get smaller rubber particles from polymerization. That is, we can polymerized the monomers to get small rubber particles (0.005–0.20 $\mu$m), then agglomerating them into desired particle sizes.

According to the present invention, in order to obtain a rubber-modified styrenic resin composition having little or no unpleasant odor, the residual styrenic monomer should be in an amount of below 1500 ppm, while the residual 4-vinyl cyclohexene should be in an amount of below 150 ppm based on the rubber modified styrenic resin composition. Preferably, the residual styrenic monomer in an amount of below 850 ppm, and the residual 4-vinyl cyclohexene is in an amount below 100 ppm.

The butadienic rubber particles having a particle size of below 0.1 $\mu$m are 19.5 to 99%, preferably 50 to 98%, based on the total number of the butadienic rubber particles. The butadienic rubber particles having a particle size in the range of 0.1 to 0.25 $\mu$m are 0.5 to 60%, preferably 1 to 40%, based on the total number of the butadienic rubber particles. The butadienic rubber particles having a particle size of over 0.25 $\mu$m are 0.5 to 80%, preferably 1 to 70%, based on the total number of the butadienic rubber particles. If the distribution of the particle sizes does not fall within the aforementioned ranges, a good balance of the falling impact strength and the gloss of molded product cannot be obtained. The number average particle size of the butadienic rubber in the present invention is in the range of 0.08 to 0.35 $\mu$m, preferably in the range of 0.09 to 0.14 $\mu$m. If the average particle size of the butadienic rubber is smaller than 0.08 $\mu$m, the falling impact strength would be poor. If the average particle size of the butadienic rubber is greater than 0.35 $\mu$m, the gloss of the molded product is unsatisfactory and the tensile strength thereof would also be poor.

The number average particle size of the butadienic rubber is determined by means of a relatively thin section of resin or emulsion film which is dyed primarily and which is then photographed by a transmission electron microscope. There are about 200–1000 dispersed rubber particles presented on the photograph, and the particle size thereof are determined individually. The number average particle size, which is based on 200–1000 rubber particles, can be calculated through the following formula:

$$\text{number average particle size} = \frac{\Sigma n_i D_i}{\Sigma n_i}$$

$n_i$ is the number of rubber particles which has the diameter of Di.

Generally, the rubber particles are spherical or ellipsoidal. If it is spherical, Di is the diameter of the rubber particle. If it is ellipsoidal, Di=(p+q)/2 is the average of its major axis diameter (p) and minor axis diameter (q).

The particle size distribution is measured by the following method. The resin composition is photographed in the aforementioned manner. The number of particles having different particle sizes are counted based on a 25,000 times magnified photograph (with a particle number of more than 2,000) available from a transmission electron microscope. The number of particles having a particle size of below 0.1 $\mu$m is $n_1$. The number of particles having a particle size in the range of 0.1 to 0.25 $\mu$m is $n_2$. The number of particles having a particle size greater than 0.25 $\mu$m is $n_3$. Assuming $N=n_1+n_2+n_3$, the particles are distributed in such a manner that the particles having a size of below 0.1 $\mu$m is $(n_1/N) \times 100$ (%), the particles having a size between 0.1 to 0.25 $\mu$m is $(n_2/N) \times 100$ (%) and the particles having a size greater than 0.25 $\mu$m is $(n_3/N) \times 100$ (%).

The rubber content of the rubbery graft copolymer in the present invention is 15 to 80 wt %, preferably 45 to 75 wt %. The ratio of the grafted styrenic acrylic based copolymer to the butadienic rubber, which is the so-called degree of grafting, is 20 to 150 wt %, preferably 25 to 80 wt % based on the weight of the butadienic rubber. To obtain the desired rubber content of the resin composition, suitable amounts of the styrenic-acrylic based copolymer should be blended with the rubbery graft copolymer if necessary. The rubber content of rubber modified styrenic resin composition is 2 to 50 wt %, preferably 7 to 35 wt %, more preferably 10 to 25 wt %. If the rubber content of the rubbery graft copolymer falls within the above range, there would be no needs for further blending with the styrenic-acrylic based copolymer.

The styrenic-acrylic based copolymer forming the matrix of the rubber modified styrenic resin composition includes the ungrafted styrenic-acrylic based copolymer formed during graft polymerization of the rubbery graft copolymer and the aforementioned styrenic-acrylic based copolymer which is used to blend with the rubbery graft copolymer.

During the blending procedure of the polymers, in order to reduce both the residual styrenic monomers and the residual 4-vinyl cyclohexene, it is practical to use an extruder having a plurality of degassing vents, from which the residual styrenic monomers and the residual 4-vinyl cyclohexene are removed. An extruder having more than two degassing vents is preferably used. The pressure of the degassing vents is usually below 760 Torr (i.e., under vacuum condition) to achieve a lower level of residual styrenic monomer and residual 4-vinyl cyclohexene. By the addition of water or a volatile organic solvent to the extruder, such as n-hexane and n-octane, the residual styrenic monomers and the 4-vinyl cyclohexene can be more effectively removed. Generally, the amount of water or organic solvent to be added is 0.1 to 20 parts by weight, preferably 0.5 to 15 parts by weight based on 100 parts by weight of the resin composition.

The aforementioned stripping agents, e.g., water or an organic solvent, may be injected via the liquid injection ports which are located upstream each of the degassing vents of the extruder. The processing conditions of the extruder are selected such that the volatile components can be easily removed.

The residual level of the styrenic monomers and 4-vinyl cyclohexene in the resin composition of the present invention may be reduced by means of the following methods, for example, by choosing the feasible particle size distribution of the butadienic rubber particles, by choosing the feasible preparation method of the butadienic rubber (such as polymerization conditions, post treatment of rubber latex and agglomeration of rubber particles), by choosing feasible coagulation, stripping, dehydration and drying of the rubbery graft copolymer and by choosing feasible extrusion conditions (such as, injection of stripping agents and vacuum degree and number of ports of the degassing vents.) In fact, it is not easy to get rid of 4-vinyl cyclohexene so that combinations of more than one means described above should be used to achieved the desired effect.

The rubber-modified styrenic resin composition may be further added with other additives if necessary. Examples of the additives are antioxidants, plasticizers, processing aids, lubricants, UV absorbers, UV stabilizers, anti-statics, fillers, reinforcing agents, coloring agents, flame retardants, synergistic additives of the flame retardants, heat stabilizers, coupling agents or other additives. The foregoing additives may be added during the polymerization, after the polymerization, before coagulation or during the process of extrusion blending.

Examples of the antioxidants are phenolic antioxidants, thio-ether anti-oxidants, phosphorous-based antioxidants and chelating agents. The phenolic antioxidants are preferably added in an amount of 0.005 to 2.0 wt %. Representative examples of the phenolic antioxidants include octadecyl (3,5-di-tert-butyl-4-hyroxyphenyl) propionate, triethylene glycol-bis[3-(3-tert-butyl-5-methyl-4-hydroxyphenyl)propionate, pentaerythritol-tetrakis-[3-(3,5-di-tert-butyl-4-hydroxyphenyl) propionate, 2-tert-butyl-6-(3-tert-butyl-2-hydroxy-6-methylbenzyl)-4-methylphenyl acrylate, 2,2'-methylene-bis-(4-methyl-6-tert-butyl phenol), butylated reaction product of p-cresol and dicyclopentadiene, 2,2'-thio-bis-(4-methyl-6-tert-butyl phenol), 2,2'-thio-diethylene-bis[3(3,5-di-tert-butyl-4-hydroxy-phenyl) propionate], and 2,2'-ethylene diamide-bis[ethyl-3-(3,5-di-tert-butyl-4-hydroxy-phenyl) propionate].

The thio-ether antioxidants are preferably added in an amount of 0.005 to 2.0 wt %. Representative examples of the thio-ether antioxidants include distearyl thio-dipropionate, dipalmityl thio-dipropionate, dilauryl thio-dipropionate, pentaerythritol-tetrakis-(β-dodecylmethyl-thiopropionate) and dioctadecyl thioether.

The phosphorous-based antioxidants include phosphite, phosphate, phosphonite and phosphonate antioxidants. The phosphorous-based antioxidants are preferably added in an amount of 0.015 to 2.0 wt %. Representative examples of the phosphorous antioxidants are tris(nonylphenyl) phosphite, tris(2,4-di-t-butylphenyl)phosphite, triisodecyl phosphite, distearyl pentaerithritol di-phosphite, triphenyl phosphite, diphenyl isodecyl phosphite, tris(isotridecyl) phosphite, tetraphenyl dipropylene glycol, diphosphite, distearyl hydrogen phosphite, diphenyl phenyl phosphonate, tetrakis (2,4-di-tert-butyl phenyl)4,4'-biphenylene diphosphonite.

The chelating agent is preferably added in an amount of 0.001 to 2.0 wt %. Representative examples of the chelating agent include 2,2'-oxamido-bis-[ethyl 3-(3,5-di-tert-butyl-4-hydroxyphenyl)propionate], the sodium salt of ethylene diamine tetraacetic acid, amino tri(methylene phosphonic acid), 1-hydroxy ethylidene(1,1-diphosphonic acid), ethylene diamine tetra(methylene phosphonic acid), hexamethylene diamine tetra(methylene phosphonic acid) and diethylene triamine penta(methylene phosphonic acid).

Representative examples of the lubricants include metal soap, such as calcium stearate, magnesium stearate, zinc stearate, and lithium stearate, ethylene-bis-stearamide, methylene-bis-stearamide, palmityl amide, butyl stearate, palmityl stearate, polyglycerol tristearate, n-docosanoic acid, stearic acid, polyethylene wax, octacosanoic acid wax, Carnauba wax and petroleum wax. The amount of the lubricants is generally 0.03 to 5.0 wt %, based on the total amount of the rubber-modified styrenic resin composition. A processing aid, such as methyl methacrylate-based copolymer, may be added to improve the extrusion and thermoforming. Representative examples of the UV-absorber include benzotriazole compounds and benzophenones. Representative examples of the UV stabilizers include hindered amines. The amount of the preceding additives is generally 0.02 to 2.0 wt % based on the total amount of the rubber-modified styrenic resin composition.

Representative examples of the anti-statics include low molecular compounds, such as tertiary amines and quaternary ammonium salts, and a polymeric material having permanent anti-static property, such as polyamide polyether and epichlorohydrin polymer.

Representative examples of the fillers include calcium carbonate, silica and mica.

Representative examples of the reinforcing agents include glass fiber, carbon fiber and various whiskers.

Representative examples of the coloring agent include titanium oxide, ferric oxide, graphite and phthalocyanine blue.

Representative examples of the flame retardant or its synergistic additives include decabromo-diphenyl ether, tetrabromo-bisphenol A, brominated-polystyrene oligomer, bromoepoxy resin, hexabromocyclododecane, chloropolyethylene, triphenyl phosphate, red phosphorous, antimony oxide, aluminium hydroxide, magnesium hydroxide, zinc borate, melamine-isocyanate, phenol resin, silicone resin, polytetrafluoroethylene and expanding graphite.

Representative examples of the heat stabilizer include dibutyl tin maleate and basic magnesium aluminium hydroxy carbonate. A low molecular styrene-maleic anhydride copolymer can also serve as a hear stabilizer to prevent thermal discoloring. The a amount of the heat stabilizer is in generally 0.1 to 1.0 wt %, based on the total amount of the rubber modified styrenic resin composition of the present invention.

Representative examples of the coupling agent include silane, titanate and zirconate.

To improve the properties of the styrenic resin composition, suitable polymeric additives may be added to the rubber modified styrenic resin composition of the present invention. Suitable polymeric additives include acrylonitrile-butadiene-styrene resin which is prepared by bulk, solution, bulk-suspension polymerization, acrylonitrile-EPDM-styrene (AES) resin, acrylonitrile-acrylate rubber-styrene (AAS) resin, maleic anhydride-styrene copolymer, styrene-N-phenyl maleimide copolymer, styrene-acrylonitrile-N-phenyl maleimide copolymer having more than 40 wt % of N-phenyl maleimide, styrene-acrylonitrile-maleic anhydride copolymer imidized with aniline, crosslinked rubbers such as acrylonitrile-butadiene rubber, vinyl chloride resin, poly methyl methacrylate, polycarbonate resin, polyamide resin, polybutylene terephthalate, styrenic thermoplastic elastomer, polyester elastomer, polyether ester elastomer, polyurethane elastomer and various compatibilizers. The acrylonitrile-butadiene-styrene resin prepared by bulk, solution or bulk-suspension polymerization can be added to the rubber modified styrenic resin composition of the present invention to impart either better impact strength or desired gloss level of the resin composition, such as low gloss resin composition. The amount of the polymeric additives is 3 to 200 parts by weight, based on 100 parts by weight of the rubber-modified styrenic resin composition of the present invention.

The present invention is more specifically described and explained by means of the following examples. It is to be understood that the present invention should not be limited to these Examples.

[PREPARATION EXAMPLE I-1]

Preparation of Butadienic Rubber Latex (A1)

A reactor tank provided with a mixing device, a heating device and a feeding pipe was charged with the following raw materials.

| components | weight parts |
|---|---|
| butadiene | 100.0 |
| tert-dodecyl mercaptan | 0.2 |
| sodium pyrophosphate | 3.0 |
| potassium oleate | 1.5 |
| potassium persulfate | 0.3 |
| distilled water | 140.0 |

The reaction started at 45° C. The reaction temperature is gradually increased with the increase of the conversion of monomers until the reaction has been carried out for 50 hours. The resulting butadienic rubber latex has a conversion of monomer of greater than 90%. After the polymerization is completed, the unreacted butadiene is removed by stripping. The solid content in the latex is 41% and the number average particle size of the rubber in the latex is 0.14 μm. The latex is referred to as A1 hereinafter.

[PREPARATION EXAMPLE I-2]

Preparation of Butadienic Rubber Latex (A2)

A reactor tank provided with a mixing device, a heating device and a feeding pipe was charged with the following raw materials.

| components | weight parts |
|---|---|
| butadiene | 93.0 |
| styrene | 7.0 |
| tert-dodecyl mercaptan | 0.2 |
| sodium pyrophosphate | 3.0 |
| potassium oleate | 1.5 |
| potassium persulfate | 0.15 |
| distilled water | 140.0 |

The reaction was carried out at 70° C. for 12 hours and was then cooled to terminate the same. The resulting butadienic rubber latex has a conversion of monomer of greater than 92%. After the polymerization is finished, the unreacted butadiene is removed by stripping. The solid content in the latex is 40% and the number average particle size of the rubber in the latex is 0.06 μm. The latex is referred to as A2 hereinafter.

[PREPARATION EXAMPLE I-3]

Preparation of Butadienic Rubber Latex (A3)

The components are identical to those in Preparation Example I-2. At first, 20% of the total monomers and 20% of oleate and potassium persulfate solution were added at the same time. The remaining 80% of the total monomers and 80% of potassium oleate and potassium persulfate were added continuously within 5 hours. The reaction was carried out at 65° C. for 9 hours and was then cooled to terminate the same. The resulting butadienic rubber latex has a conversion of monomer of greater than 85%. The unreacted butadiene was removed by stripping after the polymerization. The solid content in the latex is 39% and the number average particle size of the rubber in the latex is 0.07 μm. The latex is referred to as A3 hereinafter.

[PREPARATION EXAMPLE II]

Synthesis of an Acid Group-containing Agglomerating Copolymer Latex (II)

| components | weight parts |
|---|---|
| n-butyl acrylate | 85.0 |
| methacrylic acid | 15.0 |
| tert-dodecyl mercaptan | 0.3 |
| potassium oleate | 2.0 |
| dioctyl sodium sulfosuccinate | 1.0 |
| cumene hydroperoxide | 0.4 |
| sodium formaldehyde sulfoxylate | 0.3 |
| distilled water | 200.0 |

The above components were placed in a polymerization device and were polymerized at 70° C. for 4 hours to yield a rubber latex with a conversion greater than 98%, a pH value of 6.1, and a number average particle size of 0.07 μm.

[PREPARATION EXAMPLE III-1]

Preparation of Agglomerated Rubber Latex (C1)

To 100 parts by weight of the butadienic rubber latex (A2), 1.5 parts by weight (dry weight) of the acid group-containing agglomerating copolymer latex (II) and 0.1 parts by weight of an inorganic electrolyte $Na_2SO_4$ were added within 5 seconds with stirring. Stirring is continued for 30 minutes to yield an agglomerated rubber latex having a number average particle size of 0.38 μm. The rubber latex is referred to as C1 hereinafter.

[PREPARATION EXAMPLE III-2]

Preparation of Agglomerated Rubber Latex (C2)

To 100 parts by weight of the butadienic rubber latex (A2), 1.8 parts by weight (dry weight) of the acid group-containing agglomerating copolymer latex (II) and 0.2 parts by weight of an inorganic electrolyte $Na_2SO_4$ were added within 5 seconds with stirring. Stirring is continued for 30 minutes to yield an agglomerated rubber latex having a number average particle size of 0.45 μm. The rubber latex is referred to as C2 hereinafter.

PREPARATION EXAMPLE [III-3]

Preparation of Agglomerated Rubber Latex (C3)

100 parts by weight (dry weight) of the butadienic rubber latex (A3) were agglomerated in a manner similar to that in Preparation Example III-2 to yield an agglomerated rubber latex having a number average particle size of 0.43 μm. The rubber latex is referred to as C3 hereinafter.

[EXAMPLE 1]

(1) Preparation of the Rubbery Graft Copolymer 100 parts by weight (dry weight) of the butadienic rubber latex (A1), 0.2 part by weight (dry weight) of tert-dodecyl mercaptan (TDM) as a chain transfer agent, as indicated in Table 1, 0.32 part by weight of cumene hydroperoxide, 0.2 part by weight of sodium formaldehyde sulfoxylate, 2 parts by weight of potassium oleate and 200 parts by weight of water were added in a nitrogen-purged reactor. 70 parts by weight of styrene and 30 parts by weight of acrylonitrile were mixed and added subsequently. Graft polymerization was carried out at 60° C. for 8.5 hours to yield a rubbery graft copolymer having a conversion of 94%. The particle size distribution and the number average particle size of the rubber graft copolymer (G1) are shown in Table 2.

The rubbery graft copolymer G2–G8 were prepared with the same procedure as the rubbery graft copolymer (G1) except that butadienic rubber latex and chain transfer agent used were different, which were shown in Table 1.

TABLE 1

Polymerization conditions of the rubbery graft copolymers

| Rubbery graft copolymer | | G1 | G2 | G3 | G4 | G5 | G6 | G7 | G8 |
|---|---|---|---|---|---|---|---|---|---|
| Butadienic rubber latex | | A1 | A1 | A2 | A3 | C1 | C1 | C2 | C3 |
| Chain transfer agent | TDM | 0.2 | — | 0.2 | 0.2 | 0.2 | — | 0.2 | 0.2 |
| for the graft polymerization | α-Methyl | — | 0.2 | — | — | — | 0.2 | — | — |
| (parts by weight) | Styrene Dimer | | | | | | | | |
| Monomer conversion of the graft polymerization (%) | | 94.0 | 93.2 | 94.5 | 94.2 | 93.6 | 92.8 | 93.8 | 94.0 | note: TDM is tert-dodecyl mercaptan.

(2) Preparation of the Resin Composition

5% of sulfuric acid solution was added into the aforementioned rubbery graft copolymer latex. The mixture was stirred at 90° C. for 10 minutes and then coagulated to yield a slurry. The slurry was stripped with steam at 112° C. and 4 kg/cm$_2$ for 60 minutes, dehydrated and washed with hot water, and then dried for 1 hour under 80° C. and 120 torr, resulting in a rubbery graft copolymer powder. The rubbery graft copolymer powder was then mixed with the styrene-acrylonitrile resin (the weight ratio of acrylonitrile/styrene= 30/70, the molecular weight is 120,000), 0.1 wt % of 2,6-di-tert-butyl-4-methyl phenol, 0.1 wt % of tris (nonylphenyl) phosphite and 2.0 wt % of ethylene bis-stearamide, with respect to 100 wt % of the resin composition, to form a mixture having a rubber content of 19%. The mixture was extruded with a Werner & Pfleiderer ZSK-35 twin screw extruder (made in Germany) under 240° C. The pressure of the first degassing vent (V1) and the second degassing vent (V2) of the extruder are 150 torr and 60 torr, respectively. N-hexane as a stripping agent was added through an injection port between the feed inlet and the first degassing vent (V1), and through an injection port between the two degassing vents (V1, V2) in an amount of 2.5 parts by weight and 1.8 parts by weight, respectively, based on 100 parts by weight of the resin composition (as shown in Table 3).

[EXAMPLES 2–7]

The procedure of Example 1 was repeated, except that different rubbery graft copolymers or mixtures thereof, as shown in Table 2, were used. The polymerization conditions of each of the rubbery graft copolymers are listed in Table 1. Post treatments of the rubbery graft copolymer slurry after coagulation are listed in Table 3. By controlling the stripping, drying and extrusion conditions, the final resin composition can be obtained.

[EXAMPLE 8]

(1) Preparation of the Rubbery Graft Copolymer (G9)

200 parts by weight (dry weight) of the butadienic rubber latex (A1), 0.2 part by weight (dry weight) of α-methyl styrene dimer as a chain transfer agent, 0.32 part by weight of tert-butyl hydroperoxide, 0.2 part by weight of sodium formaldehyde sulfoxylate, 2 parts by weight of potassium oleate and 200 parts by weight of water were added in a nitrogen-charged reactor. 70 parts by weight of styrene and 30 parts by weight of acrylonitrile were then mixed and added continuously. Graft polymerization was carried out at 60° C. for 8.5 hours to yield a rubbery graft copolymer (G9) having a conversion of monomer of 93.6%. The number average particle size of the butadienic rubber is 0.14 μm. The particle size of the butadienic rubber is distributed in such a manner that 62.4% of the particles have a particle size of below 0.1 μm, 32.4% of the particles have a particle size of 0.1 to 0.25 μm, and 5.2% of the particles have a particle size of greater than 0.25 μm, all percentages being based on the total number of particles.

(2) Preparation of the Resin Composition

5% of sulfuric acid solution was added into the above rubbery graft copolymer (G9) latex. The mixture was stirred at 90° C. for 10 minutes and then coagulated to yield a slurry. The slurry was dehydrated and washed with water at 40° C., resulting in a rubbery graft copolymer (G9) powder having a moisture content of 31.2%. The rubbery graft copolymer (G9) powder was mixed with styrene-acrylonitrile-N-phenyl maleimide copolymer (the weight ratio of acrylonitrile/ styrene/N-phenyl maleimide=22/70/8, the molecular weight thereof is 108,000), 0.1 wt % of 2,6-di-tert-butyl-4-methyl phenol, 0.1 wt % of tris(nonylphenyl) phosphite and 2.0 wt % of ethylene bis-stearamide, with respect to 100 wt % of the resin composition, to form a mixture having a total rubber content of 19 wt %. The mixture was extruded with a Toshiba TEM-35 twin screw extruder (made in Japan) under 240° C. The pressure of the first degassing vent (V1) and the second degassing vent (V2) of the extruder are 90 torr and 20 torr, respectively.

[EXAMPLE 9]

(1) Preparation of the Rubbery Graft Copolymer (G10)

200 parts by weight (dry weight) of the butadienic rubber latex (A1), 0.2 part by weight (dry weight) of TDM as a chain transfer agent, 0.32 part by weight of tert-butyl hydroperoxide, 0.2 part by weight of sodium formaldehyde sulfoxylate, 2 parts by weight of potassium oleate and 200 parts by weight of water were added into a reactor under the presence of nitrogen. 70 parts by weight of styrene and 30 parts by weight of acrylonitrile were then mixed and added continuously. Graft polymerization was carried out at 40° C. for 8.5 hours to yield a rubbery graft copolymer having a conversion of monomer of 94.2%. The number average particle size of the butadienic rubber is 0.14 μm. The particle size of the butadienic rubber is distributed in such a manner that, based on the total number of particles, 62.3% of the particles have a particle size of below 0.1 μm, 32.4% of the particles have a particle size of 0.1 to 0.25 μm, and 5.3% of the particles have a particle size greater than 0.25 μm.

(2) Preparation of the Resin Composition

5% of sulfuric acid solution was added into the above rubbery graft copolymer latex. The mixture was stirred at 90° C. for 10 minutes and then coagulated to yield a slurry. The slurry was stripped with steam at 112° C. and 4 kg/cm² for 90 minutes, and was dehydrated and washed with water at 80° C., thereby resulting in a rubbery graft copolymer (G10) powder having a moisture content of 29.8%. The rubbery graft copolymer (G10) powder was mixed with the styrene-acrylonitrile resin (the weight ratio of acrylonitrile/styrene=30/70, the molecular weight is 120,000), 0.1 wt % of 2,6-di-tert-butyl-4-methyl phenol, 0.1 wt % of tris(nonylphenyl) phosphite and 2.0 wt % of ethylene bis-stearamide, with respect to 100 wt % of the resin composition, to form a mixture having a total rubber content of 19 wt %. The mixture was extruded with a Toshiba TEM-35 twin screw extruder (made in Japan) under 240° C. The pressure of the first degassing vent (V1) and the second degassing vent (V2) of the extruder are 150 torr and 60 torr, respectively. 2.5 parts by weight and 1.8 parts by weight of n-hexane, with respect to 100 parts by weight of the resin composition, are respectively injected into the two injection ports upstream between the two degassing vents (V1) and (V2).

[EXAMPLE 10]

(1) Preparation of the Rubbery Graft Copolymer (G11)

300 parts by weight (dry weight) of butadienic rubber latex (A1), 0.2 part by weight (dry weight) of α-methyl styrene dimer as a chain transfer agent, 0.32 part by weight of cumene hydroperoxide, 0.2 part by weight of sodium formaldehyde sulfoxylate, 2 parts by weight of potassium oleate and 200 parts by weight of water were added into a reactor under the presence of nitrogen. 60 parts by weight of styrene, 10 parts by weight of α-methyl styrene, 2 parts by weight of methyl methacrylate and 28 parts by weight of acrylonitrile were then mixed and added continuously. Graft polymerization was carried out at 60° C. for 8.5 hours to yield a graft copolymer having a conversion of monomer of 93.6%. The number average particle size of the rubber is 0.14 μm. The particle size of the butadienic rubber is distributed in such a manner that, based on the total number of particles, 62.0% of the particles have a particle size of below 0.1 μm, 33.6% of the particles have a particle size of 0.1 to 0.25 μm, and 4.4% of the particles have a particle size greater than 0.25 μm.

(2) Preparation of the Resin Composition

5% of sulfuric acid solution was added into the above rubbery graft copolymer latex. The mixture was stirred at 90° C. for 10 minutes and then coagulated to yield a slurry. The slurry was stripped with steam at 112° C. and 4 kg/cm² for 60 minutes, and was dehydrated and washed with hot water at 80° C., thereby resulting in a rubbery graft copolymer powder having a moisture content of 29.2%. The rubbery graft copolymer (G11) powder was mixed with the styrene-α-methyl styrene-acrylonitrile-methyl methacrylate resin (the weight ratio of acrylonitrile/styrene/α-methyl styrene/methyl methacrylate=28/50/18/4, the molecular weight thereof is 132,000), 0.1 wt % of 2,6-di-tert-butyl-4-methyl phenol, 0.1 wt % of tris(nonylphenyl) phosphite and 2.0 wt % of ethylene bis-stearamide, with respect to 100 wt % of the resin composition, to form a mixture having a total rubber content of 19 wt %. The mixture was extruded with a Toshiba TEM-35 twin screw extruder (made in Japan) under 240° C. The pressure of the first degassing vent (V1) and the second degassing vent (V2) of the extruder are 120 torr and 40 torr, respectively.

[COMPARATIVE EXAMPLES 1–4]

The procedure of Example 1 was repeated, except that the various rubbery graft copolymer and mixtures thereof as shown in Table 2 were used. Post treatments of the coagulated rubbery graft copolymer solution are listed in Table 3. By controlling the stripping, drying and extrusion conditions, the final resin composition can be obtained.

TABLE 2

The average particle size and the particle size distributions of the rubbery graft copolymers or the mixtures thereof

|  |  | Examples | | | | | | | Comparative Examples | | | |
|---|---|---|---|---|---|---|---|---|---|---|---|---|
|  |  | 1 | 2 | 3 | 4 | 5 | 6 | 7 | 1 | 2 | 3 | 4 |
| Rubbery graft copolymers | | G1 | G2 | G3 | G3 | G3 | G3 | G4 | G1 | G1 | G2 | G3 |
| | | | G5 | G5 | G6 | G7 | G7 | G8 | | | | |
| Rubber particle size distribution (%) | less than 0.1 μm | 62.4 | 68.5 | 76.4 | 75.2 | 74.2 | 52.5 | 78.2 | 62.4 | 62.4 | 62.4 | 96.4 |
| | 0.1 ~ 0.25 μm | 32.4 | 27.5 | 20.8 | 22.0 | 14.0 | 13.0 | 19.6 | 32.4 | 32.4 | 32.4 | 3.2 |
| | greater than 0.25 μm | 5.2 | 4.0 | 2.8 | 2.8 | 11.8 | 34.5 | 2.2 | 5.2 | 5.2 | 5.2 | 0.4 |
| Number average particle size (μm) | | 0.14 | 0.12 | 0.11 | 0.11 | 0.13 | 0.23 | 0.11 | 0.14 | 0.14 | 0.14 | 0.075 |

TABLE 3

Post treatment of the slurry of the rubbery graft copolymer

|  |  | Examples |  |  |  |  |  |  | Comparative Examples |  |  |  |
|---|---|---|---|---|---|---|---|---|---|---|---|---|
|  |  | 1 | 2 | 3 | 4 | 5 | 6 | 7 | 1 | 2 | 3 | 4 |
| Stripping of the coagulated slurry | | YES | NO | YES | NO | NO | NO | NO | YES | NO | NO | YES |
| Moisture content of the rubbery graft copolymer after drying (%) | | 0.1 | 0.3 | 0.5 | 0.3 | 0.3 | 0.6 | 0.2 | 1 | 0.5 | 0.5 | 0.3 |
| Pressure of the degassing | V1 (*1) | 150 | 180 | 80 | 240 | 170 | 180 | 240 | closed | 760 | 150 | 300 |
| vent of the extruder (torr) | V2 (*1) | 60 | 70 | 45 | 120 | 80 | 100 | 20 | 380 | 180 | 80 | 140 |
| Amount of the stripping agent | injection port between feed opening and V1 | 2.5 | 2.2 | 4 | 1.8 | 1.8 | 1.8*2 | 1.8 | — | 1.8 | — | 1.8 |
| n-hexane (parts by weight) | injection port between V1 and V2 | 1.8 | 1.8 | — | — | — | — | — | — | — | — | — |

*1: V1 and V2 are respectively the first degassing vent and the second degassing vent of the extruder.
*2: The stripping agent is water.

The resin composition produced from the Examples and Comparative Examples were injected into test pieces. The test pieces were tested for their physical properties, such as falling impact strength, surface gloss, tensile strength, residual content of vinyl aromatic monomer and 4-vinyl cyclohexene content and the unpleasant odor test. The test results are shown in Table 4.

(1) Falling Impact Strength

A circular test disc having a radius of 50 mm and a thickness of 3 mm were injection molded with the use of an injection molding machine. A steel ball having a weight of 5 kg struck the center of the test disc at a temperature of 23° C. The minimum energy needed to break the test disc was measured. The unit adapted is kg·cm.

(2) Surface Gloss

A molded piece of 50 mm (width)×90 mm (length)×3 mm (thickness) was injection molded at 280° C. with the use of an injection molding machine. The gloss of the molded piece was tested at a 60° angle of incidence. The average value of the gloss of five molded pieces are adapted in terms of %.

(3) Tensile Strength

Tensile strength is tested in accordance with ASTM D-638. The unit adapted is kg/cm$^2$.

(4) Residual Contents of Vinyl Aromatic Monomers and 4-vinyl Cyclohexene

The residual contents of vinyl aromatic monomers and 4-vinyl cyclohexene were tested by dissolving the resin composition in dimethyl formamide (DMF), and analyzing the resin composition solution by a gas chromatograph (GC) provided with a flame ionized detector (FID) (available from Hewlett Packard company under serial No. 5890A)

(5) The Unpleasant Odor Test

The resin composition was cut into pellets. 150 g of the pellets were placed in a sealed glass pot. After the pellets has been cooled down, the glass pot was opened for smell. The existence of the unpleasant odor was tested by ten people who have a sensitive sense of smell. The unpleasant odor test was graded based on the number of persons who smell out the unpleasant odor and was represented by the following levels.

| number of persons who smell out the unpleasant odor | level |
|---|---|
| less than 2 persons | ⊚ |
| 2 to 4 persons | ○ |
| 4 to 8 persons | Δ |
| more than 8 persons | x |

TABLE 4

Physical properties of the resin compositions

|  | Examples |  |  |  |  |  |  |  |  |  | Comparative Examples |  |  |  |
|---|---|---|---|---|---|---|---|---|---|---|---|---|---|---|
|  | 1 | 2 | 3 | 4 | 5 | 6 | 7 | 8 | 9 | 10 | 1 | 2 | 3 | 4 |
| Total rubber content of the resin composition (wt %) | 19 | 19 | 19 | 19 | 19 | 19 | 19 | 19 | 19 | 19 | 19 | 19 | 19 | 19 |
| Falling impact strength (kg · cm) | 400 | 390 | 390 | 390 | 380 | 410 | 390 | 370 | 400 | 390 | 400 | 400 | 400 | 220 |
| Gloss (%) | 92 | 92 | 94 | 94 | 94 | 90 | 94 | 91 | 92 | 93 | 92 | 92 | 93 | 96 |
| Tensile strength (kg/cm$^2$) | 414 | 418 | 420 | 420 | 422 | 410 | 416 | 403 | 415 | 412 | 414 | 416 | 418 | 485 |
| Residual styrenic monomer (ppm) | 520 | 580 | 480 | 690 | 645 | 630 | 702 | 720 | 582 | 642 | 1860 | 860 | 620 | 890 |
| Residual 4-vinyl cyclohexene (ppm) | 45 | 62 | 52 | 60 | 58 | 110 | 65 | 100 | 70 | 86 | 380 | 272 | 184 | 62 |
| the unpleasant odor test | ⊚ | ⊚ | ⊚ | ⊚ | ⊚ | ○ | ⊚ | ○ | ⊚ | ⊚ | x | x | x | ⊚ |

The results of Table 4 indicate that by controlling the residual content of styrenic monomers to below 1500 ppm and the residual content of 4-vinyl cyclohexene to below 150 ppm, and by suitably adjusting the average particle size and particle size distribution of the rubber particles, a rubber-modified styrenic resin composition having excellent falling impact strength, high tensile strength, and good gloss can be obtained. In addition, the unpleasant odor, which is generally generated during processing, is significantly reduced. Therefore, a molded product having little or no unpleasant odor can be produced.

It should be noted that the above Examples are listed for illustrating the preferred embodiment to help practice the present invention and are not to be interpreted so as to limit the scope of the present invention.

With this invention thus explained, it is apparent that numerous modifications and variations can be made without departing from the scope and spirit of this invention. It is therefore intended that this invention be limited only as indicated in the appended claims.

We claim:

1. A rubber-modified styrenic resin composition comprising a matrix of styrenic-acrylic based copolymer and butadienic rubber particles dispersed in said matrix, said styrenic-acrylic based copolymer being prepared from an acrylonitrile monomer and/or a methacrylate monomer, a styrenic monomer and, optionally, other copolymerizable monomers, the rubber-modified styrenic resin composition further comprising residual styrene monomer and residual 4-vinyl cyclohexene, said residual styrene monomer being present in said composition in an amount below 1500 ppm and said residual 4-vinyl cyclohexene being present in said composition in an amount below 150 ppm, the number average particle size of the butadienic rubber particles being 0.08 to 0.35 $\mu$m, the butadienic rubber particles being distributed such that the amount of the butadienic rubber particles having a particle size of below 0.1 $\mu$m is 19.5 to 99%, the amount of the butadienic rubber particles having a particle size of between 0.1 to 0.25 $\mu$m is 0.5 to 60%, and the amount of the butadienic rubber particles having a particle size of greater than 0.25 $\mu$m is 0.5 to 80% based on the total number of the butadienic rubber particles, wherein the number average particle size of the butadienic rubber particles in the resin composition and the amounts of the residual styrene monomer and the residual 4-vinyl cyclohexane in the resin composition are limited so as to minimize unpleasant odor in said composition.

2. A rubber-modified styrenic resin composition according to claim 1, wherein the amount of the butadienic rubber particles having a particle size of below 0.1 $\mu$m is 50 to 98%, the amount of the butadienic rubber particles having a particle size of 0.1 to 0.25 $\mu$m is 1 to 40%, and the amount of the butadienic rubber particles having a particle size of greater than 0.25 $\mu$m is 1 to 70% based on the total number of the butadienic rubber particles.

3. A rubber-modified styrenic resin composition according to claim 1, wherein the number average particle size of the butadienic rubber is between 0.09 to 0.14 $\mu$m.

4. A rubber-modified styrenic resin composition according to claim 1, wherein the amount of the residual styrenic monomers is below 850 ppm.

5. A rubber-modified styrenic resin composition according to claim 1, wherein the amount of the residual 4-vinyl cyclohexene is below 100 ppm.

* * * * *